Oct. 22, 1963

R. G. COKER ETAL 3,107,564

TUBE CUTTING MACHINE

Filed Aug. 24, 1959

INVENTORS
RICHARD G. COKER,
CLEMENT D. LE HARDY,
BY CHARLES K. DUNLAP, JR. &
JAMES E. SLIGH

Parrott & Richards
ATTORNEYS

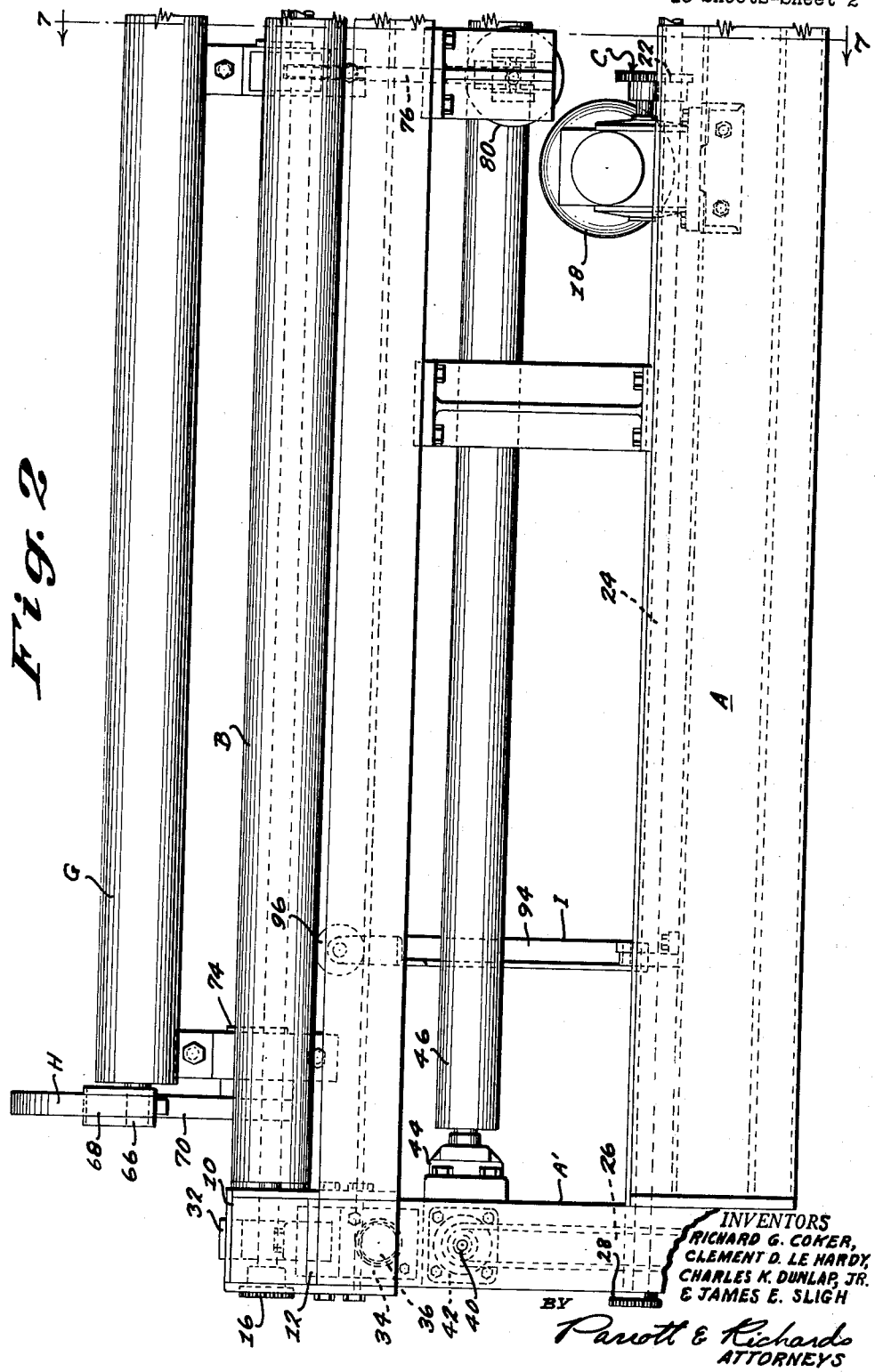

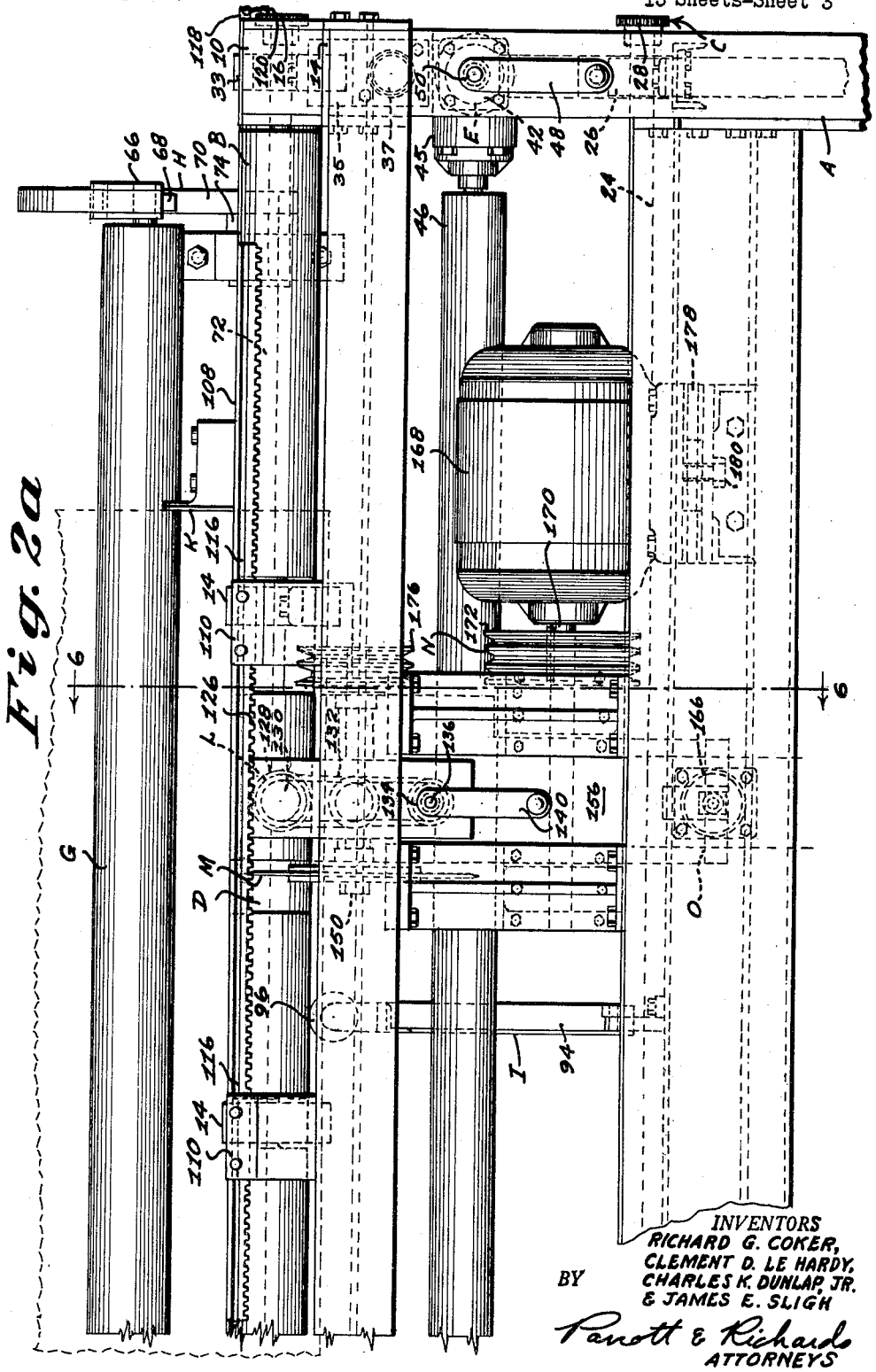

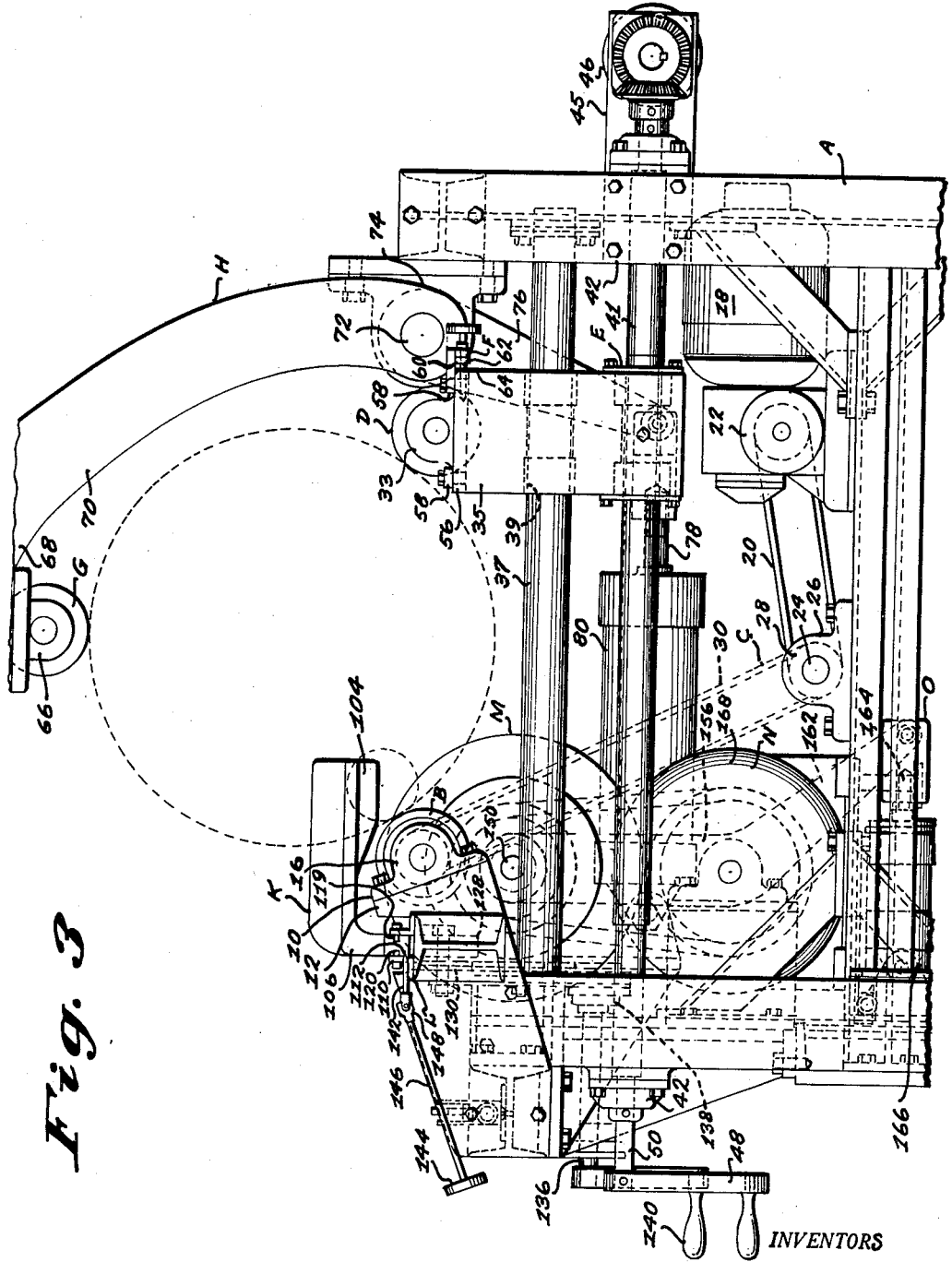

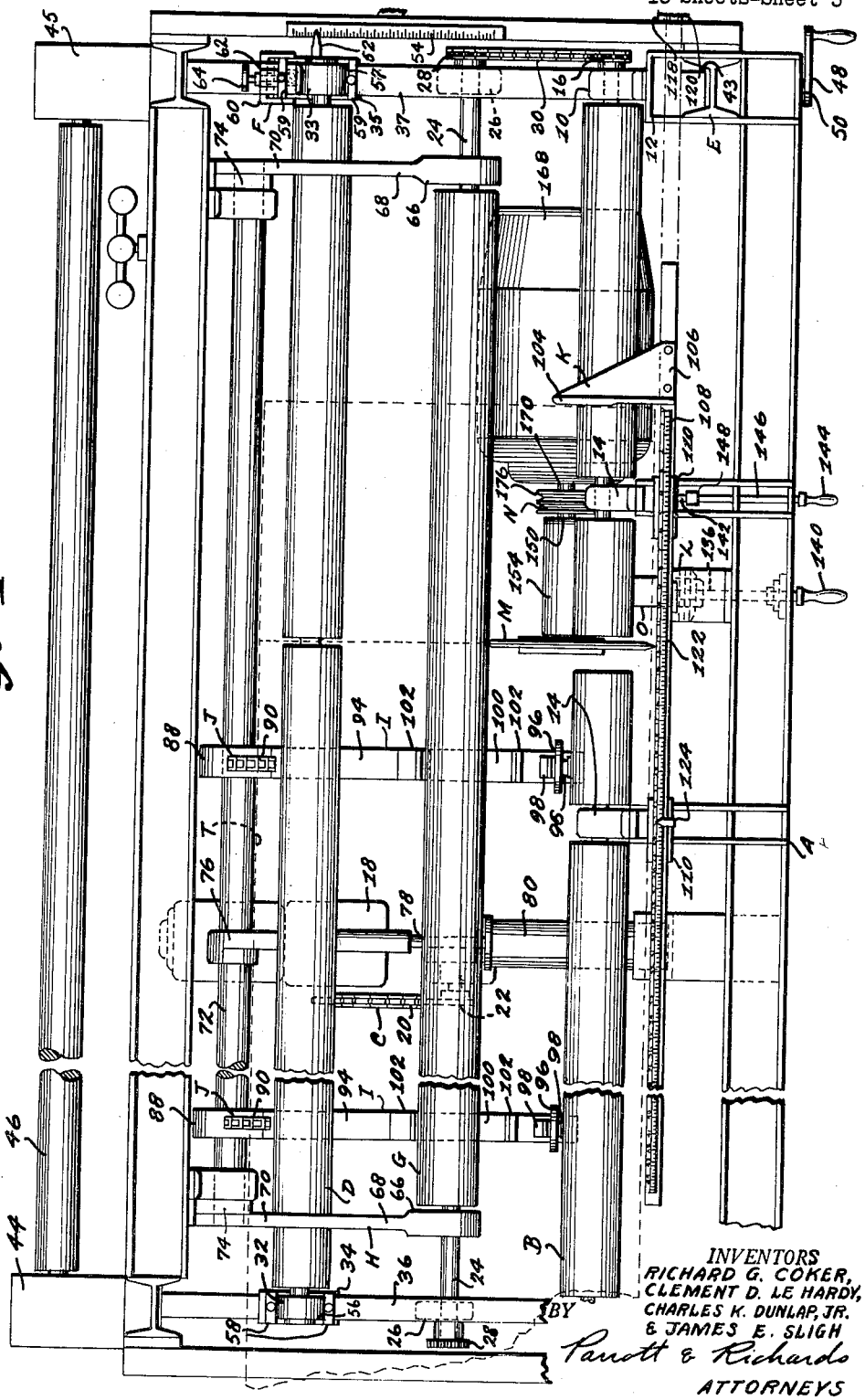

INVENTORS
RICHARD G. COKER,
CLEMENT D. LE HARDY,
CHARLES K. DUNLAP, JR.
& JAMES E. SLIGH
BY Parrott & Richards
ATTORNEYS

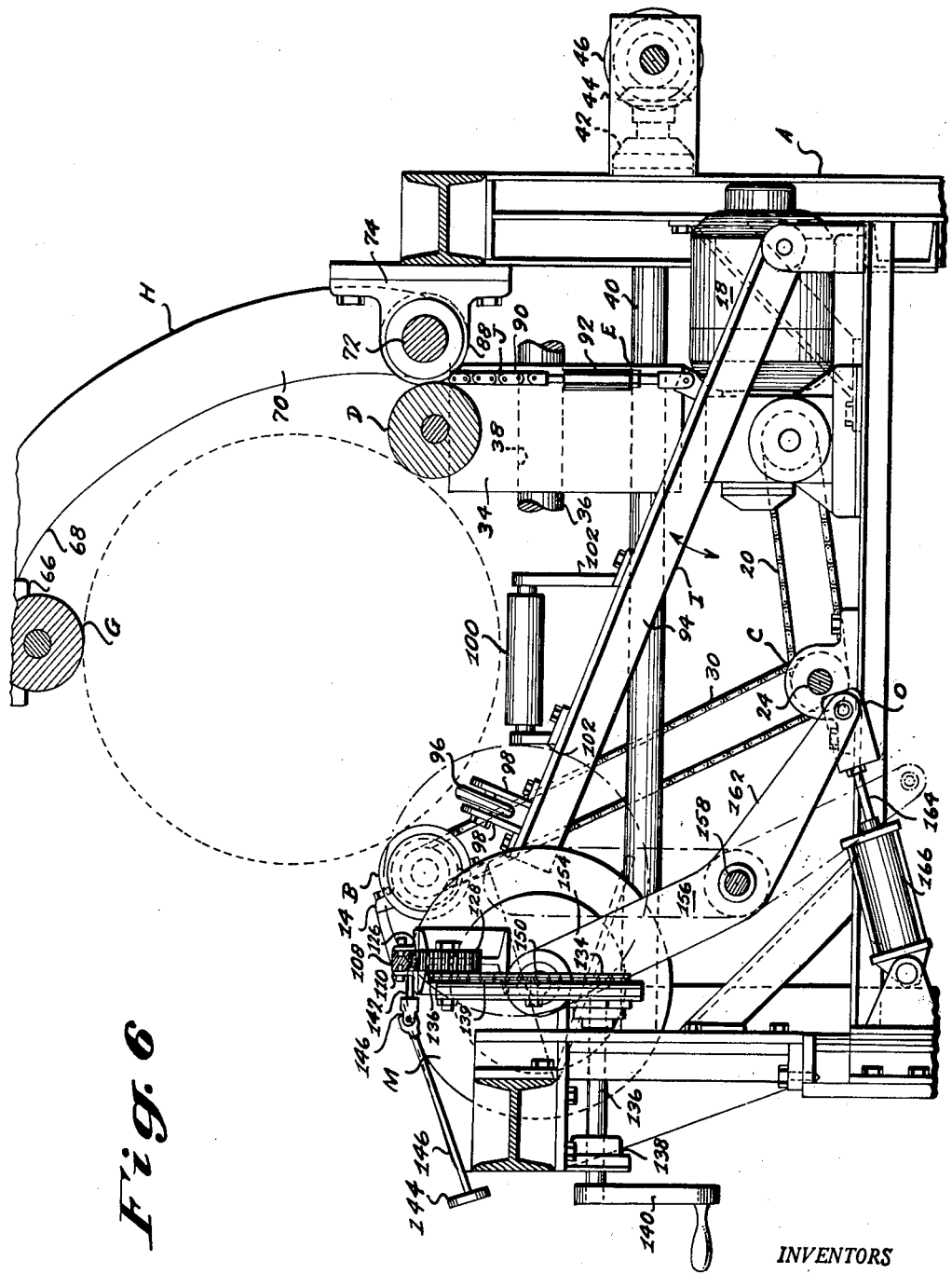

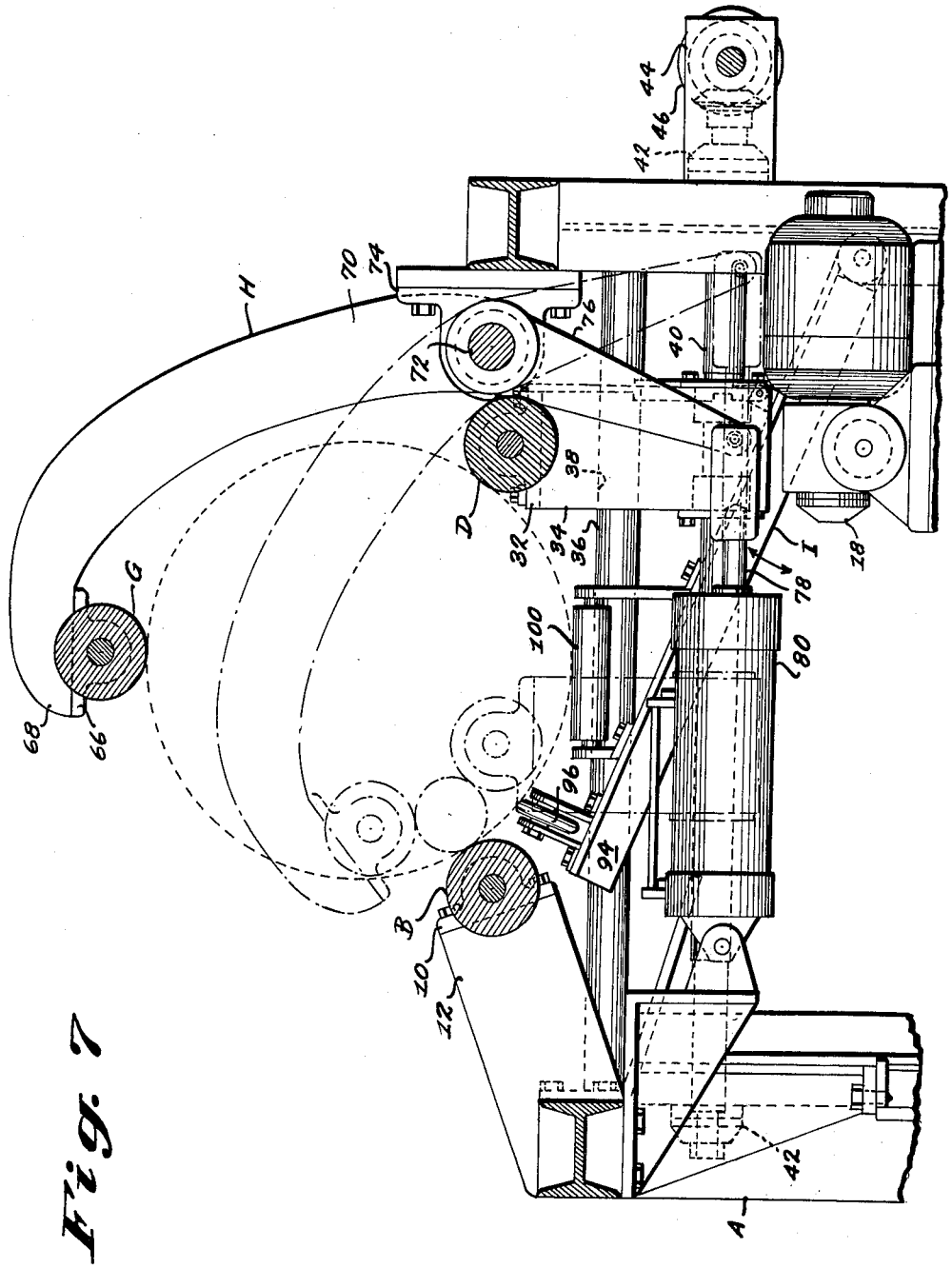

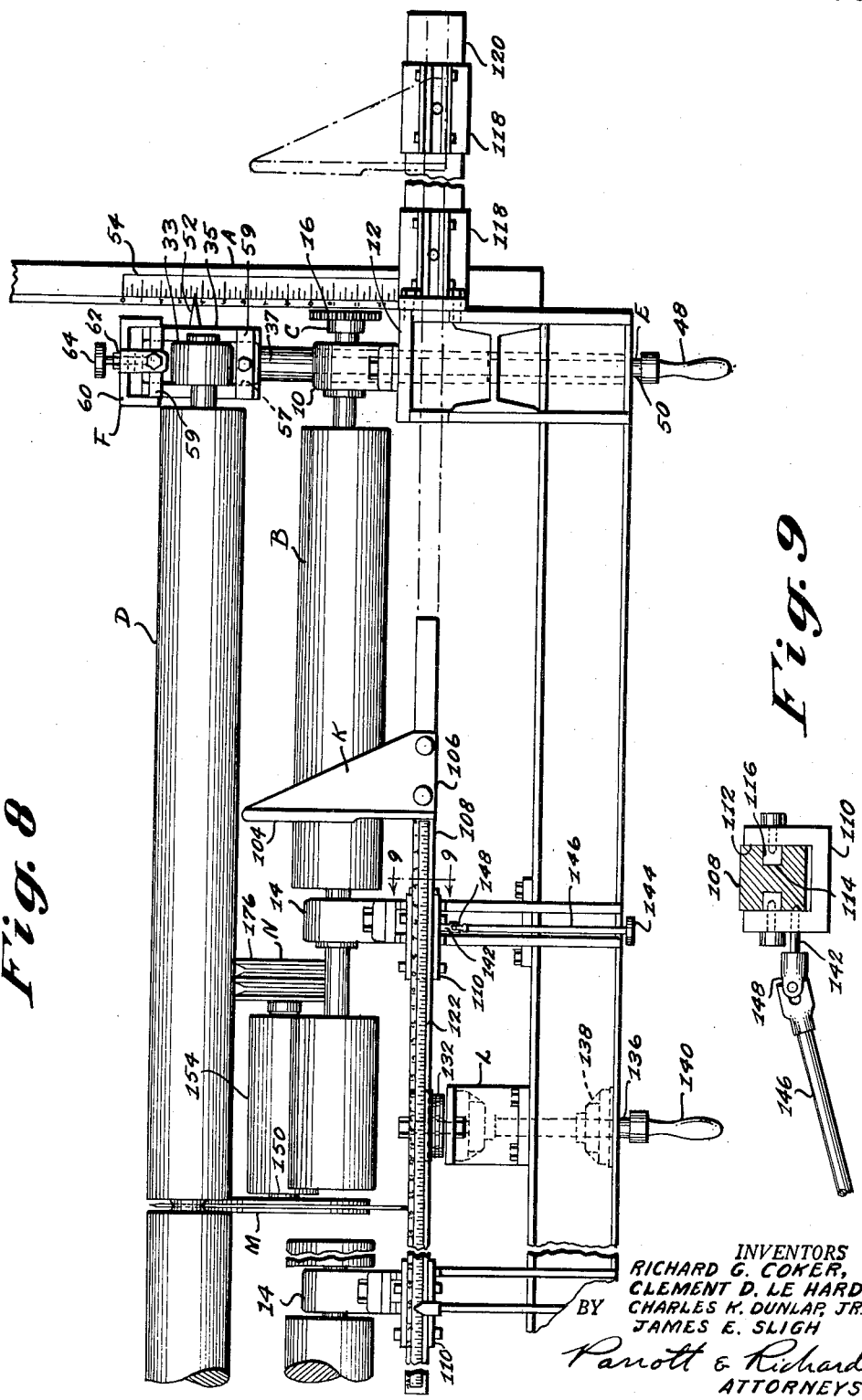

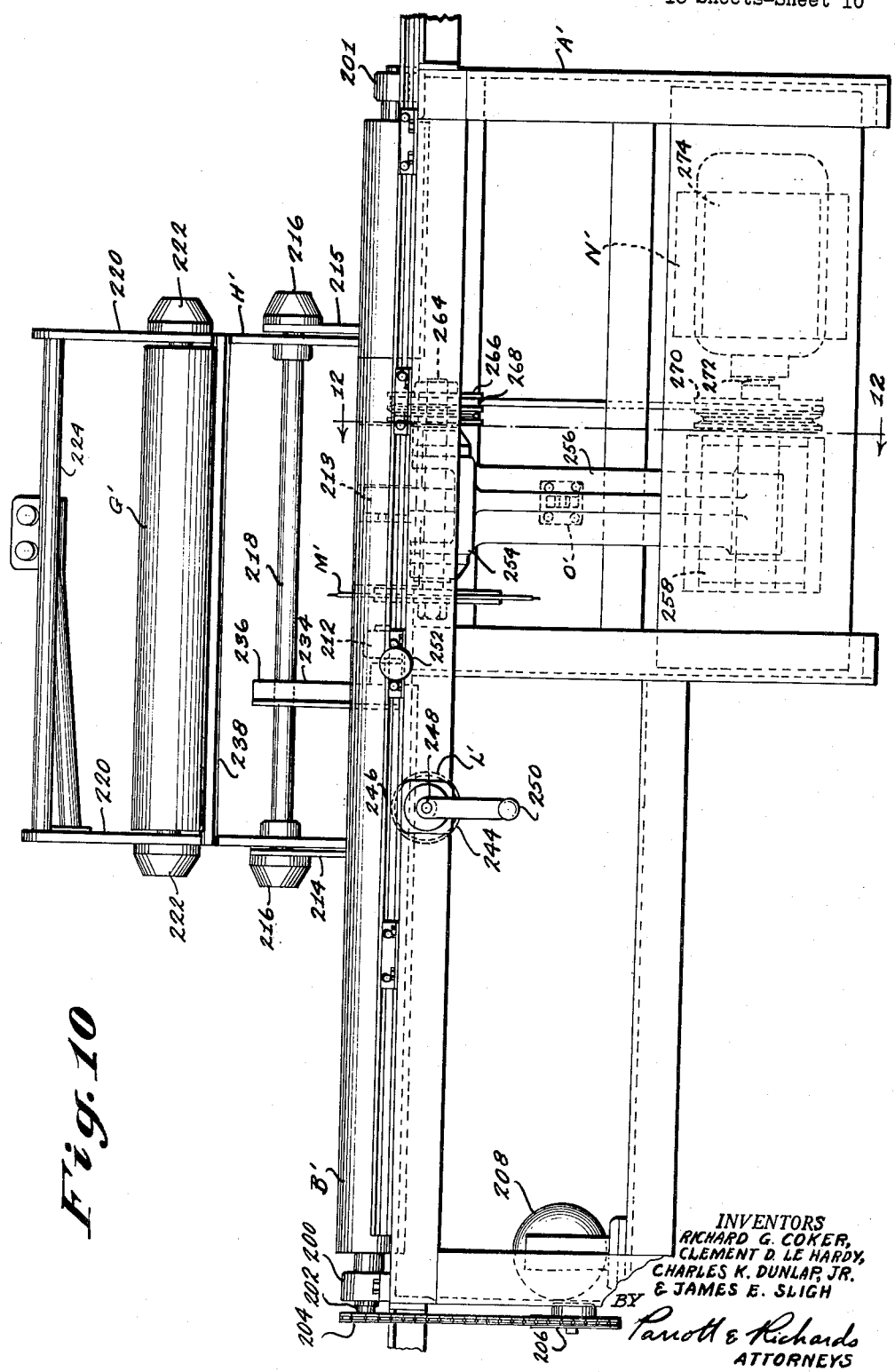

Oct. 22, 1963  R. G. COKER ETAL  3,107,564
TUBE CUTTING MACHINE

Filed Aug. 24, 1959  13 Sheets-Sheet 12

INVENTORS
RICHARD G. COKER,
CLEMENT D. LE HARDY,
BY CHARLES K. DUNLAP, JR.
& JAMES E. SLIGH

Parrott & Richards
ATTORNEYS

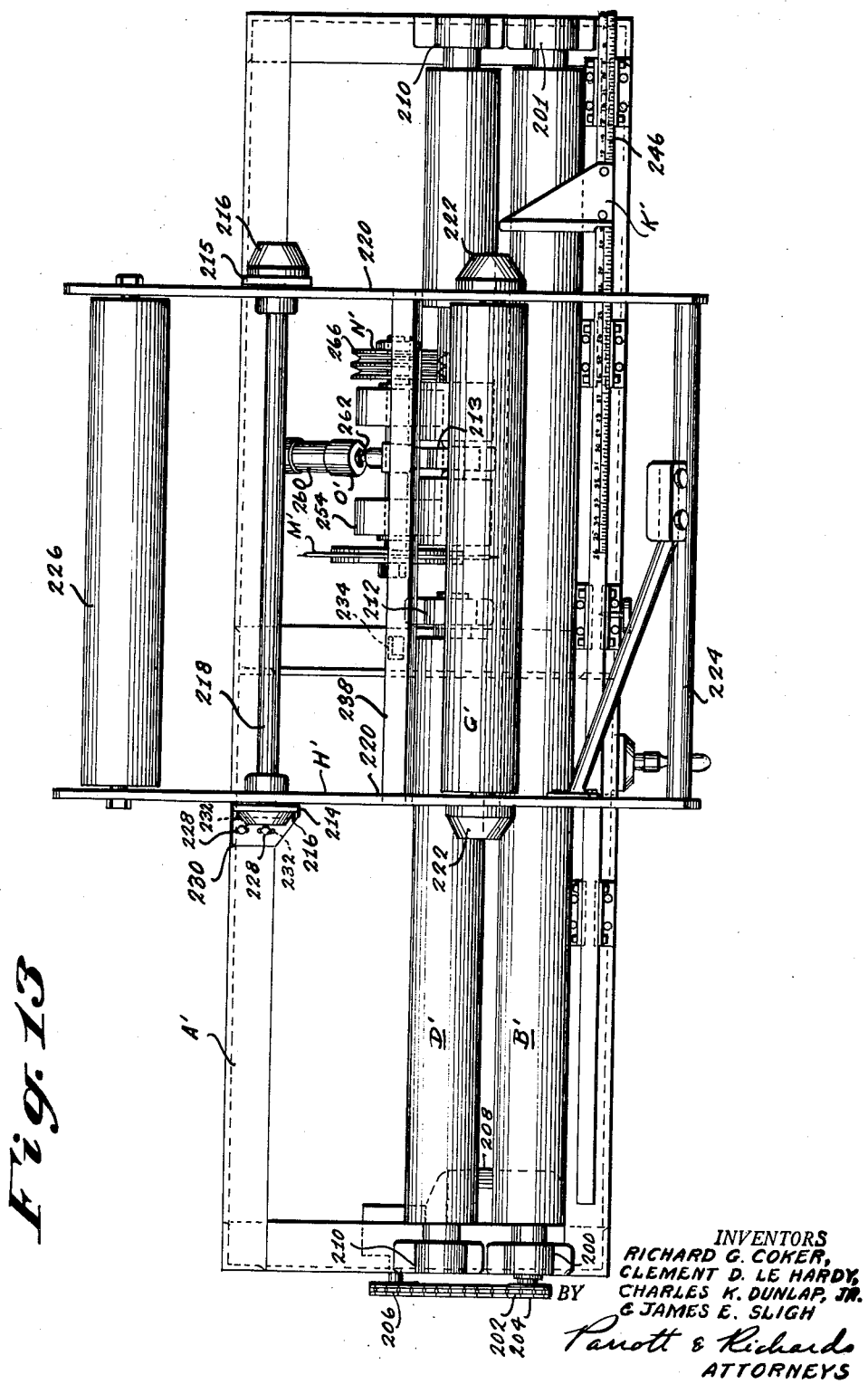

United States Patent Office 3,107,564
Patented Oct. 22, 1963

3,107,564
TUBE CUTTING MACHINE
Richard G. Coker, Clement D. Le Hardy, Charles K. Dunlap, Jr., and James E. Sligh, Hartsville, S.C., assignors to Sonoco Products Company, a corporation of South Carolina
Filed Aug. 24, 1959, Ser. No. 835,612
2 Claims. (Cl. 82—101)

The present invention relates to tube cutting machines, and more particularly to a tube cutting machine that is operable to releasably, but firmly, clamp a tube and rotate the tube past a saw blade that is advanced through the thickness of the tube wall to cut the tube into sections, with the machine firmly supporting and rotating the sections on both sides of the saw to produce a clean and true cut.

In the manufacture of tubes and in adapting them to particular applications, it is often necessary to cut the tubes into sections of specified lengths and to trim the ends to provide a clean and true edge. Thus, a cutting operation of some type is required either by a portable hand or power saw that passes through the entire diameter of the tube or by some type of tube cutting machine. These methods have produced satisfactory results in cutting small diameter tubes of rigid material but have been unsatisfactory for cutting large diameter tubes and tubes made of material that permits slight flexing or deformation of the tube walls.

Large diameter tubes are difficult to cut using portable saws because the saw must be of a diameter more than twice the diameter of the tube, which is cumbersome, and it is difficult to guide a saw through a large diameter tube without some deviation, which produces an untrue cut. No tube cutting machine has heretofore been designed that can efficiently handle a large diameter tube in a commercially satisfactory operation and yet produce a true cut.

Even greater difficulty is encountered in cutting tubes made of material that can flex or deform, this is true of tubes of small as well as large diameter, and even though the deformation or flexing is slight. With these tubes the action of the saw and/or the supporting or holding force deforms the tube during the cutting operation, with the result that when the tube reforms to its original shape the line of the cut may deviate undesirably from a straight and true line. This problem would be accentuated if a conventional glass tube or metal pipe cutting machine of the type in which the article is rotated where used to cut deformable or flexible wall tubes as these machines clamp the body section of the tube without holding or positively transmitting rotation to the other section. Thus the deformation caused by clamping would not be uniform as it would not occur in the other section and, further, the other section, not being held down, would tend to flex or otherwise deviate from alignment with the clamped section, resulting in an untrue or even jagged edge.

The present invention provides a tube cutter that produces a true and accurate cut simply and quickly in large diameter tubes and in deformable wall tubes with no problem of deviation or unevenness of the cut. It can be made to operate semi-automatically, and is particularly adaptable to a rapid production operation, yet it is adjustable to accommodate tubes of different diameters and to cut sections of various lengths.

Basically the tube cutting machine of the present invention comprises three supporting and clamping rolls arranged in parallelism and between which a tube to be cut is held for rotation past a saw blade. Two of the rolls are in a horizontal plane and support the tube before the third or upper roll is clamped down onto the tube. The upper arm is mounted on a pivoted support that is positioned and proportioned to position the top roll substantially at the top point of the tube being cut, regardless of the diameter of the tube. One of the lower rollers is driven to impart rotation to the tube so that it will move past a rotating saw blade that is pivotally mounted and that remains out of the path of the tube until the tube is rotated, at which time the saw is pivoted into the tube wall. The saw blade is located intermediate the ends of the rolls so that the sections of the tube on both sides of the saw blade will be clamped and rotated uniformly, thereby avoiding a deformation or deviation of the cut-off section during cutting and holding the tube in a precise location to make a true and accurate cut.

The machine includes an easily manipulatable target mechanism against which the end of the tube to be cut is positioned to cut a predetermined length and can be accurately adjusted to vary the length as desired. The mechanism includes a graduated indicia so that the operator can quickly set the target to any desired length by turning a handle until a pointer is aligned with the indicia that indicates the desired length.

Another problem inherent in tube cutting machines of the type wherein parallel rolls are used to rotate a tube, and particularly large diameter tubes, past a rotating saw blade is that of "walking" of the tube longitudinally due to slight misalignment of the rolls. Even a minute misalignment of the rolls will cause a noticeable advance of the tube in one revolution, especially in a large diameter tube, which results in a spiral cut so that the beginning and end of the cut do not meet and the tube must be rejected or re-cut.

Other and further features of the present invention will be apparent from the following description and drawings in which:

FIGS. 2 and 2A are a front elevational view of the tube cutting machine of FIG. 1 with the front guard plates removed;

FIG. 3 is an end elevational view of the right-hand end of the tube cutting machine of FIG. 1;

FIG. 4 is a fragmentary top plan view of the tube cutting machine of FIG. 1;

FIG. 6 is a vertical sectional view taken along line 6—6 of FIG. 2;

FIG. 7 is a vertical sectional view taken along line 7—7 of FIG. 2;

FIG. 8 is an enlarged top plan view of the right front portion of FIG. 4;

FIG. 9 is an enlarged vertical sectional view taken along line 9—9 of FIG. 8;

FIG. 10 is a front elevational view of a modified embodiment of the tube cutting machine of the present invention;

FIG. 13 is a top plan view of the tube cutting machine of FIG. 10.

Figure 1:
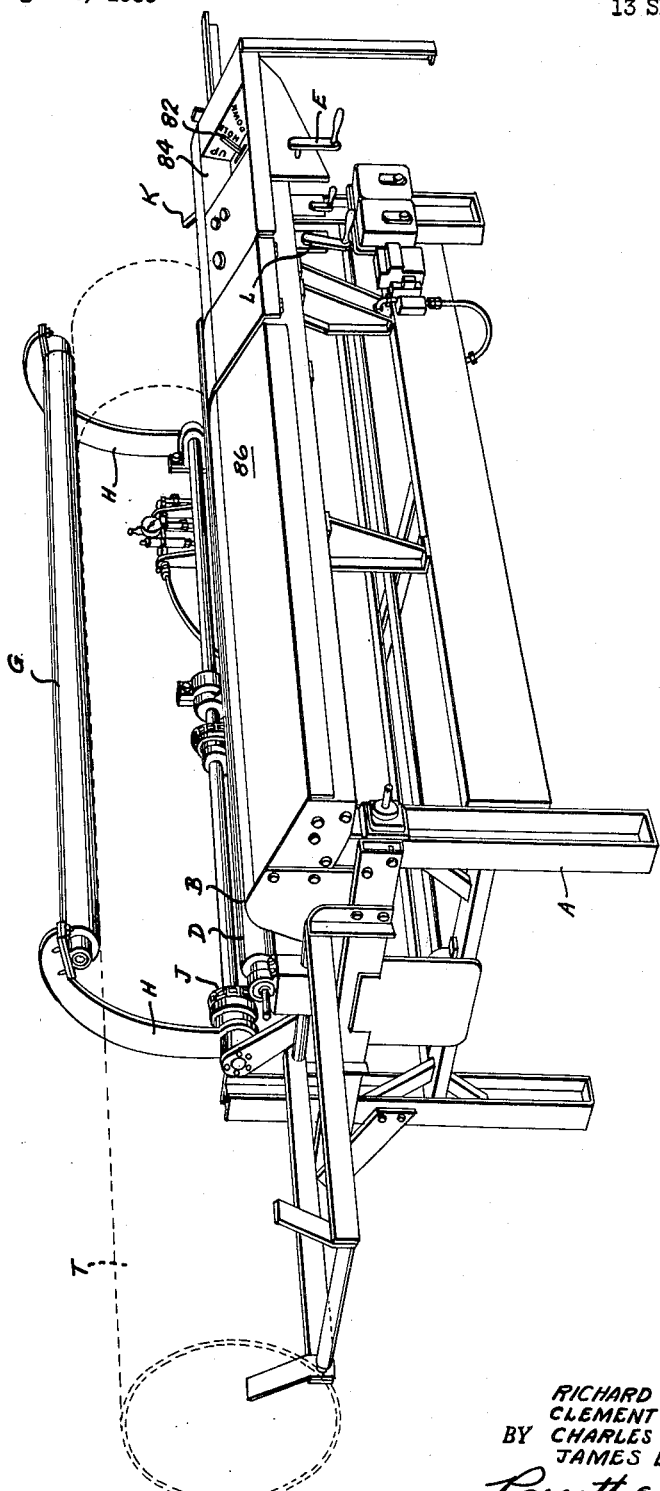
FIG. 1 is a perspective view of a preferred embodiment of the tube cutting machine of the present invention.

The embodiment of the tube cutting machine of the present invention illustrated in FIGS. 1 through 9 is larger than the machine illustrated in FIGS. 10 through 13 and is capable of cutting a wide range of tube diameters, in an automatic operation, whereas the smaller machine of FIGS. 10 through 13 can not cut as large diameter tubes and is not wholly automatic, but it has less parts and therefore is more compact and less expensive than the machine of FIGS. 1 through 9.

Referring first to the machine of FIGS. 1 through 8, it is seen to consist of a supporting framework A on which is mounted a driven front roll B with drive means C for rotating the front roll. An adjustable rear idler roll D is mounted in the same plane with and parallel to the driven front roll B. These rolls are spaced a predetermined distance to properly support a tube T thereon. Means E are provided for adjusting the position of the rear roll D to vary the spacing between the rolls for proper positioning to support tubes of various diameters. Also means F are provided for aligning the rear roll D with respect to the front roll B so that the rolls can be maintained in parallelism and thus preventing "walking" of the tube T during rotation thereof. A top clamping idler roll G is mounted on a pivoted support H above and between the front roll B and the rear roll D for clamping of the tube T between the rolls. A tube raising mechanism I is pivotally mounted on the supporting framework A for movement upwardly between the front roll B and rear roll D to lift the tube off the rolls and permit easy longitudinal advancement of the tube into cutting position. Means J are provided for raising the tube raising mechanism I into tube lifting position when the top clamping roll G is raised and for lowering the tube raising mechanism I when the top roll G is lowered and clamped onto the tube T. A tube positioning target K is adjustably mounted on the supporting framework A and extends into the path of the tube to form a stop against which the tube is positioned to determined the length of the section of the tube to be cut. The target K is positioned by adjusting means L which are operable to move the target axially with respect to the tube to adjust to any desired length of tube to be cut. The tube is cut by a saw M mounted on the supporting framework A intermediate the ends of the front roll B, rear roll D and top roll G and rotated by drive means N. This saw is movable into and out of the path of the tube and to retract the saw M after the cut has been completed.

The front roll B and the means C for driving the front roll are seen in FIGS. 2, 2A and 4. The front roll B is mounted in bearing 10 on the end plates 12 of the supporting framework A and in intermediate bearings 14 on the framework A on either side of the saw M, with sprockets 16 mounted on the ends of the roll B. A drive motor 18 for rotating the front roll B is mounted within the supporting framework A and is drivingly connected by means of a chain 20 and sprockets 22 to a jack shaft 24 that extends the full length of the machine. This shaft 24 is mounted in bearings 26 at the ends of the supporting framework A with sprockets 28 mounted on the ends thereof. Chains 30 connect the jack shaft sprockets 28 to the front roll sprockets 16 to drivingly connect the drive motor 18 and the front roll B for rotation thereof.

The front roll B is interrupted to define a clearance space for accommodating the saw M, but extends from each intermediate bearing 14 toward the saw M to provide support for the tube T closely adjacent the saw M during cutting of the tube. The front roll B is reduced in diameter adjacent the pulleys of the saw drive means N to accommodate the pulleys when the saw M is advanced into the wall of the tube T.

The rear roll D and means E for adjusting the rear roll are seen in FIGS. 3 and 4. The rear roll D extends the full length of the supporting framework A and is mounted in bearings 32, 33 which are secured to the tops of laterally adjustable carriages 34, 35 at each end of the supporting framework A. Each carriage 34, 35 is slidably mounted on a fixed transverse shaft 36, 37 that extends across the machine, and each carriage 34, 35 has a threaded bore 38, 39 extending laterally below the shaft 36, 37 through which screw shafts 40, 41 extend. These screw shafts 40, 41 are mounted in bearings 42, 43 on the supporting framework A and extend outwardly in back of the framework into bevel gear boxes 44, 45 that support a longitudinal shaft 46 extending between the gear boxes 44, 45 for transmission of simultaneous rotation from the right hand screw shaft 41 to the left hand screw shaft 40 to move the rear roll D toward and away from the front roll B while maintaining parallelism, thus adjusting the spacing between the rear roll D and front roll B for proper support of tubes of different diameters.

The screw shafts 40, 41 are rotated by manual operation of a hand crank 48 secured to the front end extension 50 of the right hand screw shaft 41. This location of the hand crank 48 is conveniently adjacent the operator's station and the other controls on the machine.

A pointer 52 is attached to the right-hand carriage 35 and extends over an indicia strip 54 attached to the supporting framework A to indicate the spacing between the front roll B and the rear roll D. The indicia strip 54 may be graduated to read directly in terms of tube diameters so that the operator can immediately adjust the spacing between the rolls to support a tube of a given diameter without computation.

The means F for aligning the rear roll D in parallelism with the front roll B, as seen in FIGS. 3 and 4, comprises an apparatus whereby the right hand bearing 33 of the rear roll can be laterally adjusted in the carriage 35. Both rear roll bearings 32, 33 are mounted in lateral slots 56, 57 on the top faces of the carriages 34, 35 with cross pieces 58, 59 straddling the slots and securing the bearings 32, 33 therein. The cross pieces 59 on the right hand carriage 35 are spaced to permit slight adjustment of the lateral position of the associated bearing 33. A U-shaped bracket 60, secured to the carriage 35, extends rearwardly and has a screw positioning sleeve 62 aligned with the slot 57. An adjusting screw 64 is mounted in the sleeve 62 and has its inner end threadably attached to the bearing 33 so that the bearing can be adjusted laterally to realign the rear roll D with respect to the front roll B. For simplicity, the drawings illustrate the above described aligning mechanism on the right hand carriage 35 only. However, it is to be understood that an aligning mechanism may also be mounted on the left hand carriage 34 to further facilitate aligning of the rear row D in parallelism with the front row B.

The top clamping roll G, pivoted support H and the associated operating mechanism are clearly shown in FIGS. 4 and 7. The roll G is mounted for free rotation in bearings 66 at the free ends 68 of the arms 70 of the pivoted support H. These arms 70 are both fixed to a longitudinal pivot shaft 72 mounted in bearings 74 at the rear of the supporting framework A. The pivot shaft 72 is rotated by a lever arm 76 fixed thereto at approximately the center point of the shaft. This lever arm 76 extends downwardly into the supporting framework A and is attached to the piston 78 of an air cylinder 80 which has its other end secured to the supporting framework. Thus upon operation of the air cylinder 80, the piston actuated the lever arm 76 to raise or lower the top roll G. The pneumatic system and controls therefor are of conventional design and include a valve operated by manipulation of the lever 82 that is mounted in the well 84 of the cover plate 86, as shown in FIG. 1. The lever 82 operates the valve when in the "Up" position to raise the top roll G, when in the "Down" position to lower the roll, and when in the "Hold" position to maintain the roll against the top of the tube T to be cut. Thus tubes of various diameters may be clamped in the machine. To accommodate large diameter tubes the arms 70 of the pivoted support H are bowed rearwardly and the top roll bearings 66 are mounted under the outer ends of the arms 70. Also, the arms 70 are proportioned so that the radius of the arc of rotation of the top roll G will intersect the top of any tube supported on the front and rear rolls, B and D, when the spacing between the front and rear rolls has been adjusted to the proper tube diameter. Thus the top roll G will always contact the top of the tube T to provide efficient clamping action.

The tube raising mechanism I and means J for raising the mechanism are seen in FIG. 6 and include a pair of spaced collars 88 fixed on the aforementioned pivot shaft 72 to the left of the saw blade M. Each collar 88 has attached thereto one end of a chain 90, the other end of which is attached, through a turnbuckle 92, to an intermediate point on a pivoted beam 94. One end of the pivoted beam 94 is pivotally mounted at the rear of the supporting framework A. The beam 94 extends forwardly and upwardly and is pivoted in a lateral plane by the chain 90 upon rotation of the pivot shaft 72. A small wheel 96 is mounted for free rotation between a pair of spaced upstanding brackets 98 adjacent the free end of the pivoted beam 94 with the axis of the wheel parallel to the beam. The wheel 96 is positioned to be between and slightly below the front roll B and the forwardmost position of the rear roll D when the beam 94 is raised, and in the raised position the wheel is inclined rearwardly, which permits the wheel 96 to be raised sufficiently to lift the tube T off the front and rear rolls, B and D, without the wheel 96 or brackets 98 striking the rear roll D.

A freely rotatable cylindrical roller 100 is also mounted between spaced brackets 102 on the pivoted beam 94 rearwardly and downwardly of the small wheel 96. This roller 100 is mounted so that it will be below the rear roll D and will not interfere therewith, but when the rear roll D is moved rearwardly to support a large diameter tube and the beam 94 is in the raised position shown in FIG. 7, the roller 100 will support the large diameter tube above the front and rear rolls, B and D.

The position of the tube in the machine is determined by a target K that extends into the path of the tube T at the right hand end of the machine. The target K and means L for adjusting the position of the target are seen in FIGS. 2A, 8 and 9. This target K has an enlarged outer end 104 for contacting the tube and has a downwardly extending inner end 106 secured to a horizontal rail 108. The rail 108 extends parallel with the front roll and is slidably mounted in spaced channel-shaped bearings 110 secured to the supporting framework A. These bearings 110 have upstanding side walls 112 with inwardly extending keys 114 secured thereto. These keys 114 ride in keyways 116 in the sides of the rail 108 to hold the rail in the bearings 110. One or more bearings 118 may be mounted on extensions 120 to the right of the machine so that the target can be moved outwardly to permit the cutting of long tube sections. The top of the rail 108 is provided with an indicia tape 122 which, in conjunction with a pointer 124 fixed on the framework and extending over the tape 122, indicates the length of the tube which will be cut when the tube is positioned against the target K. The underside of the rail is formed with teeth which serve as a rack 126 engaged by a pinion 128 mounted on the supporting framework A adjacent the saw blade M. This pinion 128 is attached to a sprocket 130 that is driven by a chain 132 connected to another sprocket 134 on a crankshaft 136 mounted in a bearing 138 on the supporting framework A below the pinion 128. This crankshaft extends beyond the front of the framework and may be rotated manually by turning a handle 140. Thus the target K can be positioned to cut a predetermined length by the operator without leaving his position.

The target K is locked in place by means of a locking screw 142 extending through one wall of one of the bearings 110 adjacent the pinion 128. This screw 142 is manually tightened by turning a handle 144 at the end of a rod 146 that is connected to the screw 142 by means of a universal joint 148. The tip of the screw 142 is pointed so that it will bite into the rack 126 and lock the target K in a desired position.

Figure 5:
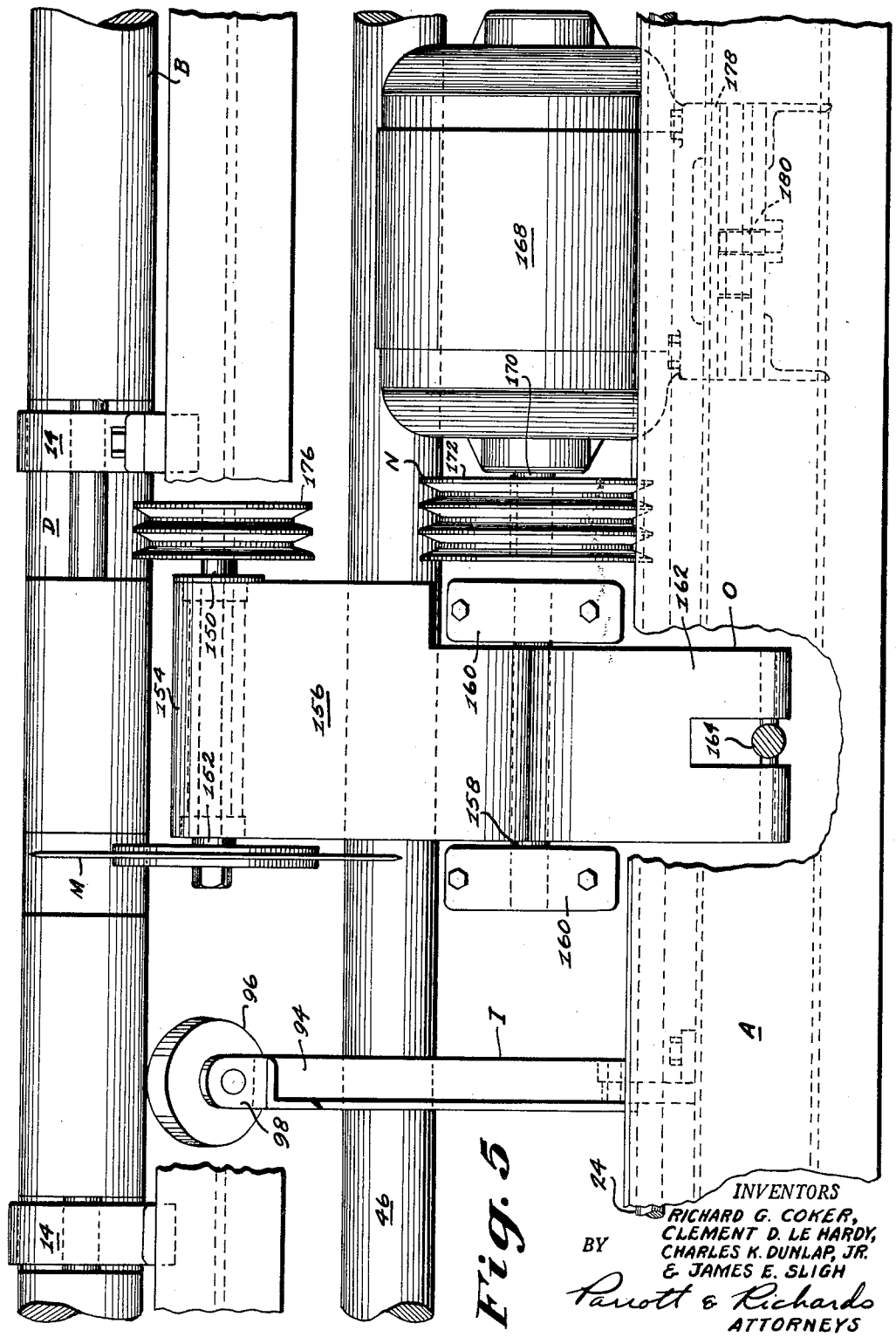
FIG. 5 is an enlarged front elevational view of the center portion of FIG. 2, partially broken away.

The saw M, means N for rotating the saw and means O for advancing the saw are seen in FIGS. 4, 5 and 6. The saw blade M is mounted in line with the above described interruption in the front roll B and on a shaft 150 secured in a bearing 152 at the free end 154 of a rocker plate 156. This rocker plate 156 is mounted on a longitudinal pivot shaft 158 extending into fixed brackets 160 on either side of the rocker plate 156. The other end 162 of the rocker plate 156 extends below the pivot shaft 158 and is secured to the end of a piston 164 of an air cylinder 166 attached to the supporting framework A in front of the rocker plate 156 so that when the air cylinder 166 is actuated the rocker plate 156 will be pivoted to retract or advance the saw blade, which is a circular blade in a plane perpendicular to the axis of the tube T.

The saw blade M is driven by a motor 168 mounted within the supporting framework A. This motor 168 drives a shaft 170 that is in line with the pivot shaft 158 of the rocker plate 156 and has attached thereto a series of pulleys 172. Belts 174 extend from the pulleys to similar pulleys 176 mounted on the end of the saw blade shaft 150 opposite the end on which the saw blade M is attached.

With this construction the saw blade M may be rotated continuously regardless of the position or movement of the rocker plate 156 and without changing the tension on the belts 174. However, the tension on the belts 174 can be varied as desired to take up any slack or to loosen the belt depending on circumstances. This is accomplished by having the drive motor 168 mounted on a plate 178 that is hinged to the supporting framework A and having an adjusting screw 180 extending through the plate 178 at a point spaced from the hinge so that by rotating the screw 180 the hinged plate 178 will be raised or lowered, thereby changing the position of the motor 168 and drive shaft 170 and changing the spacing between the pulleys 172 and 176.

In operation, a tube T is cut on the machine of the embodiment of FIGS. 1–8 by placing the tube on the machine with the elements in an initial position wherein the top roller G is in its raised position, the tube raising mechansm I is raised to lift the tube and facilitate advancement thereof, the drive roll B is stationary, and the saw blade M is in the retracted position. The rear roll D is then adjusted to the proper spacing for the diameter of the tube to be cut and the target K is adjusted to the proper length of tube to be cut. The tube T is then advanced until it contacts the target K. The saw blade motor 168 is actuated to rotate the saw blade M and the top roller G is lowered to clamp the tube in position. As seen in the perspective view of FIG. 1, the control for the top roll has a "Hold" position at which the tube will be held without forcing down against the top of the tube sufficient to cause a collapse of a thin wall tube. The drive roll motor 18 is then actuated to rotate the drive roll B and in turn rotate the tube. Simultaneously the saw blade M is advanced into the path of the tube. A single switch may be used to control both the drive roll motor and the cylinder for advancing the saw. When the tube has been completely cut the switch is released, stopping the drive roll B and the saw M. The control for the top roll is then manipulated to unclamp the tube and raise the tube raising mechanism I for easy advancement of the tube for a subsequent cut.

The modified embodiment of the tube cutting machine of the present invention, as illustrated in FIGS. 10–13, is basically similar to the embodiment of FIGS. 1–9, described above. Thus it also includes a supporting framework A', a front roll B', a rear roll D', a top clamping roll G', a pivoted support H' for the top roll, a tube positioning target K', means L' for adjusting the target, a saw M', drive means N' for rotating the saw, and means O' for advancing the saw into the wall of the tube to be cut.

The modified embodiment of the tube cutting machine of the present invention consists of a supporting framework A' on which are mounted all of the elements.

The front roll B' is a continuous roll mounted between bearings 200, 201 at the ends of the supporting framework A', with its left end 202 extending beyond the left hand bearing 200. A sprocket 204 is mounted on the end 202 to transmit rotation to the front roll B' from a drive sprocket 206 driven by a motor 208 mounted below the front roll B' on the supporting framework A'.

The rear roll D' is also mounted on the supporting framework A' in bearings 210 at the ends of the framework and in intermediate bearings 212, 213 on either side of the saw M'. The rear roll D' is interrupted to accommodate the saw blade, but extends from the right hand bearing 213 to a point closely adjacent the saw blade M' to provide support for the portion of the tube being cut off by the saw M'. The rear roll D' is also reduced in diameter adjacent the pulley of the saw rotating means N' to accommodate the pulley when it moves with the saw into the tube.

The supporting framework A' has a pair of upstanding brackets 214, 215 at the rear spaced on both sides of the saw M' for mounting of bearings 216 which pivotally support therebetween the pivot shaft 218 of the top roll support H'. A pair of spaced arms 220 are fixed to the pivot shaft 218 adjacent the brackets 214, 215 and extend above the front and rear rolls, B' and D'. The top roll G' is mounted between these arms 220 in bearings 222 forwardly of the pivot shaft 218 a distance sufficient to position the top roll G' substantially at the top of a tube supported on the front and rear rolls B' and D' when the top roll G' is lowered into contact with the tube. The pivot arms 220 extend forwardly of the top roll G' and are joined by a cross-bar 224 which serves as a handle for easy manipulation of the top roll by the machine operator and also as a mounting for control switches that are positioned for easy access by the operator when he lowers the top roll G' onto the tube. The spaced pivot arms 220 also extend rearwardly of the mounting brackets 214, 215 with their rear ends supporting a counter-weight shaft 226 to balance the roll support H' for easy manipulation.

The left hand upstanding bracket 214 is adjustable with respect to the framework A' to adjust the alignment of the top roll G' with respect to the front and rear rolls B' and D' so that the rolls will be maintained in parallelism. Thus the left hand upstanding bracket 214 is attached to the supporting framework A' by bolts 228 extending through holes in the horizontal flange 230 of the bracket 214 and through laterally enlarged slots 232 in the framework A' which permit lateral positioning of the bolts 228, and therefore provide lateral adjustment of the top roll G'.

An upstanding stop bar 234 is positioned on the supporting framework A' forwardly of the upstanding top roll supporting brackets 214 and aligned with a cross-bar 238 extending between the top roll supporting arms 220 for limiting engagement therewith to prevent the stop roll G' from being lowered into contact with the saw blade.

Figure 11:
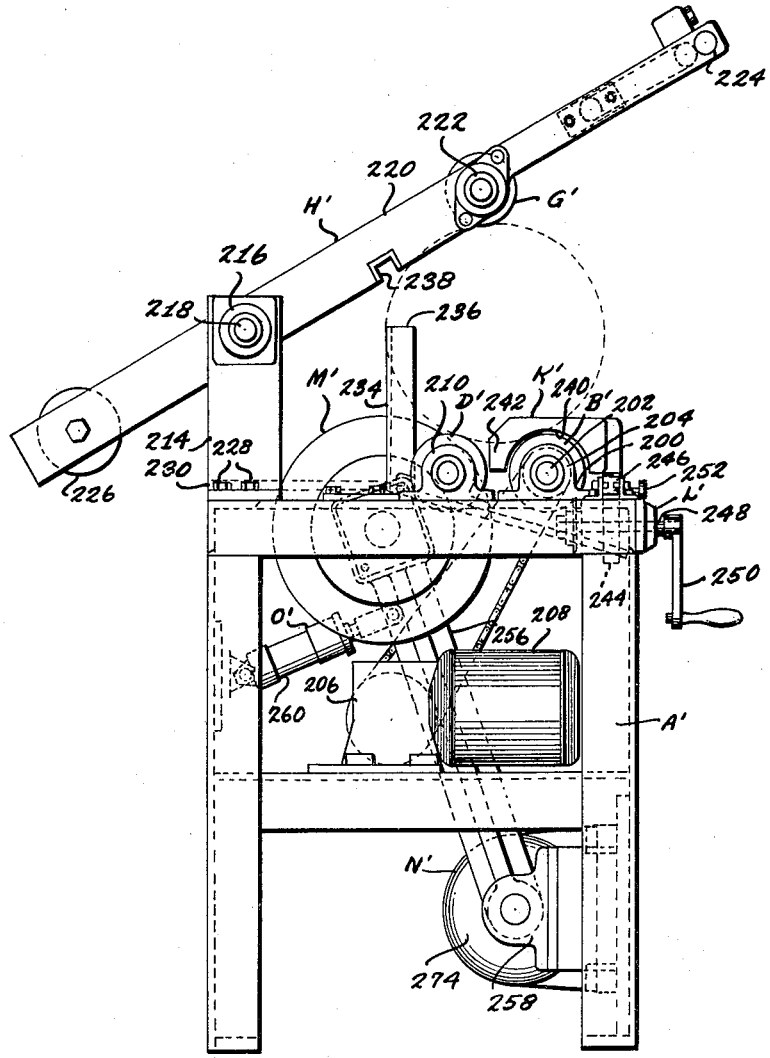
FIG. 11 is an end elevational view of the left hand end of the tube cutting machine of FIG. 10.
Figure 12:
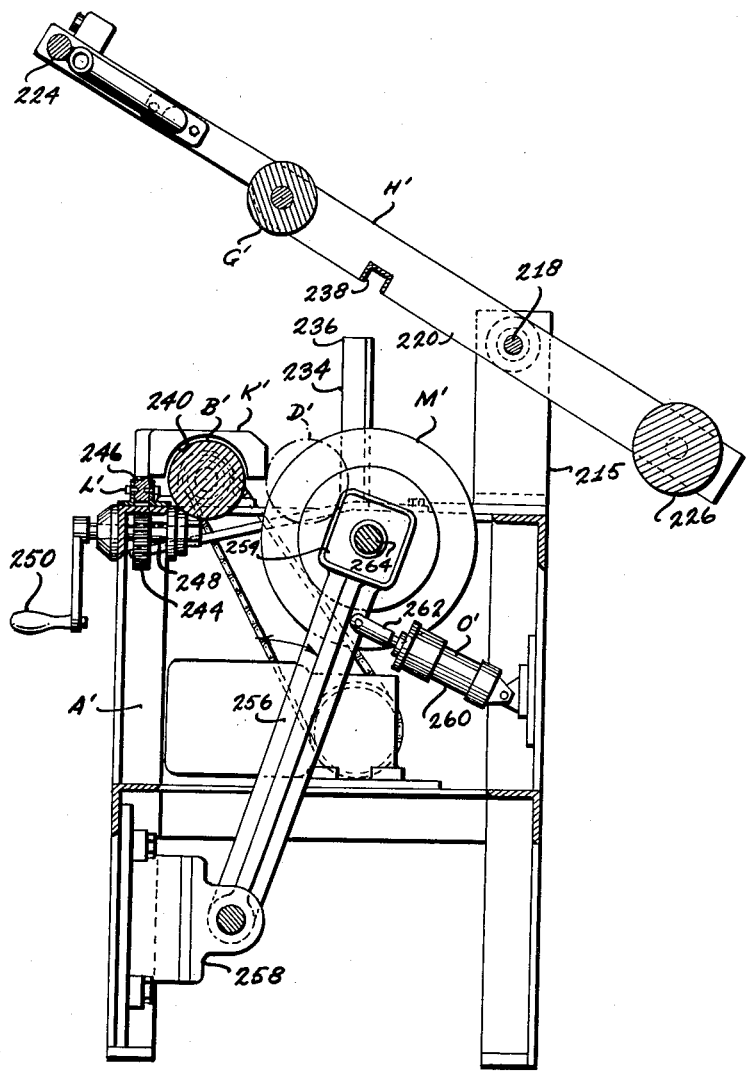
FIG. 12 is a vertical sectional view taken along line 12—12 of FIG. 10.

As clearly shown in FIGS. 11 and 12, the upstanding brackets 214, 215 extend considerably above the level of the front and rear rolls, B' and D', with the result that the arcuate path of the top roll G' closely approximates the straight vertical line representing the top point of the various diameter tubes cut on the machine. Thus efficient clamping of the tubes is accomplished regardless of the tube size.

The tube positioning target K' and its adjusting mechanism L' are substantially identical to the corresponding elements of the embodiment of FIGS. 1–8, described in detail above. Therefore the description of the elements that are identical will not be repeated. The target K' is positioned below the level of the top of the front roll B' with an arcuate recess 240 shaped to accommodate the front roll B'. Thus the inner end 242 of the target K' extends down between the front and rear rolls B' and D' to effectively engage small diameter tubes. The pinion 244 that meshes with the rack on the underside of the tube positioning rail 246 is mounted directly on the crankshaft 248 that extends forwardly of the framework A' and on which the operating handle 250 is attached. The target locking screw 252 carries a hand wheel for direct control to advance the screw 252 into the side of the rail 246 to tack the target K' in an adjusted position.

The saw blade M' is mounted adjacent to and aligned with the interruption in the rear roll D' and is at the free end 254 of a pivoted beam 256. The other end of the beam 256 is pivoted to a bracket 258 attached to the supporting framework A' below the front and rear rolls B' and D'. The bear 256 is pivoted by the means O' for advancing the saw which comprises an air cylinder 260 secured to the back side of the supporting framework A' and having a piston 262 extending therefrom and attached to the beam 256 at a point spaced from the pivot bracket 258.

The means N' for rotating the saw M' is substantially identical to the corresponding elements of the embodiment of FIGS. 1–8. Thus the saw M' is mounted on one end of a rotatable shaft 264 that is driven by pulleys 266 mounted on the other end of the shaft 264. These pulleys are connected by belts 268 and other pulleys 270 to a drive shaft 272 aligned with the pivot point of the pivoted beam 256. The drive shaft 272 is driven by a motor 274 mounted to the front of the supporting framework A'.

Before operating the machine to cut a tube, the top roll G' is in the raised position and the saw M' is in the retracted position out of the path of the tube. The target handle 250 is turned to position the target K' at the position to cut a given length of tube and the saw driving motor 274 is started to rotate the saw M'.

A tube is then placed on the front and rear rolls B' and D' with its end abutting the target K'. The top roll G' is lowered onto the tube to hold the tube between the three rolls. The control switch on the cross bar 224 of the top roll support H' is actuated when the tube is firmly clamped between the rolls. This switch can be connected to operate both the drive motor 208 for the front roll B' and the air cylinder 260 for advancing the saw blade M'. Thus, as the front roll B' rotates and turns the tube, the saw blade M' advances, cutting the tube until the switch is released by the operator, at which time the saw M' is retracted and the top roll G' is raised for removal of the cut tube and insertion of another tube.

The pneumatic systems and the electrical wiring used to control the operation of the above described embodiments of the present invention have not been described and illustrated in detail as they may be of conventional design well known to those skilled in the art.

The present invention has been described in detail above for purposes of illustration only and is not intended to be limited by this description or otherwise except as defined in the appended claims.

We claim:

1. An apparatus for cutting tubes or the like, comprising a supporting framework, a pair of parallel spaced rolls mounted on said framework, a roll supporting member pivotally mounted on said framework for movement about an axis parallel to the axes of said pair of rolls, a top roll rotatably mounted on said supporting member parallel to and spaced above said pair of rolls and movable with respect thereto to clamp a tube or the like therebetween, means for driving one of said pair of rolls to rotate said tube, a tube raising element mounted on said supporting framework for movement upwardly between said pair of rolls to lift the tube above the rolls and having means to facilitate axial advancement of the tube, means for raising said element to lift the tube when the top roll is raised out of clamping engagement with the tube, one of said rolls being interrupted intermediate its ends to define a clearance space, a saw supporting arm pivotally mounted on said framework and having a free end adjacent to and aligned with the interruption in the roll and being pivotable in a plane perpendicular to the axes of said rolls, a circular saw blade rotatably mounted on the free end of said saw supporting arm, means for rotating said saw blade, and means for advancing said saw supporting arm to advance said saw blade through said clearance space into cutting engagement with the wall of said rotating tube a distance at least as great as the wall thickness of the tube, thereby cutting the tube as it is rotated past the saw blade.

2. An apparatus for cutting tubes or the like comprising, in combination, a supporting framework, a pair of rolls mounted on said framework in parallel spaced relationship, means for simultaneously moving both ends of one of said pair of rolls to maintain parallelism between the rolls while varying the spacing therebetween to properly support tubes of various diameters, the other of said pair of rolls arranged in a fixed axial position and being interrupted intermediate its end to define a clearance space, a roll supporting member pivotally mounted on said framework for movement about an axis parallel to the axis of said pair of rolls, a top roll rotatably mounted on said roll supporting member parallel to and spaced above said pair of rolls for clamping engagement with a tube supported on said pair of rolls, the path of movement of the top roll being related to the predetermined spacing adjustment of said pair of rolls so that said top roll clampingly engages a supported tube of any diameter at substantially the top of the tube, means for driving at least one of said pair of rolls to rotate a clamped tube, a saw supporting arm pivotally mounted on said framework and having a free end adjacent to and aligned with the interruption in said other roll in an inoperative position on the opposite side of said interrupted roll from a clamped tube, said saw supporting arm being pivotable in a plane perpendicular to the axis of said rolls, a circular saw blade rotatably mounted on the free end of said saw supporting arm, means for rotating said saw blade, means for pivoting said saw supporting arm to advance said saw blade across the axis of said interrupted roll into a predetermined operative position within said clearance space with the cutting edge of said saw blade projecting outwardly from the surface of said interrupted roll in tube cutting engagement with a clamped rotating tube whereby said interrupted roll supports said clamped tube at substantially the point of cutting engagement between said blade and tube at any clamped tube diameter to provide a smooth accurate line of severance on said tube.

References Cited in the file of this patent

UNITED STATES PATENTS

| | | |
|---|---|---|
| 674,316 | Palmer | May 14, 1901 |
| 1,348,636 | Fretter | Aug. 3, 1920 |
| 1,413,191 | Rolans | Apr. 18, 1922 |
| 1,880,875 | Deutsch | Oct. 4, 1932 |
| 2,459,068 | Eastwood | Jan. 11, 1949 |
| 2,620,875 | Edwards | Dec. 9, 1952 |
| 2,771,662 | Ziska | Nov. 27, 1956 |